United States Patent [19]

Beaver

[11] 4,222,648

[45] Sep. 16, 1980

[54] FILM ADVANCE CONTROL MECHANISM

[75] Inventor: Richard C. Beaver, Inglewood, Calif.

[73] Assignee: American Electronics, Inc., Fullerton, Calif.

[21] Appl. No.: 62,543

[22] Filed: Jul. 31, 1979

[51] Int. Cl.³ .......................... G03B 1/18; G03B 1/24; G03B 41/00
[52] U.S. Cl. .............................. 354/171; 346/107 R; 352/84; 352/190
[58] Field of Search .................... 354/170, 171, 173; 352/190, 187, 84; 346/107 R, 107 VP, 22; 226/134, 120, 156, 188; 242/54 R, 55, 55.17, 201

[56] References Cited

U.S. PATENT DOCUMENTS

| | | | |
|---|---|---|---|
| 2,353,154 | 7/1944 | Fowler | 352/84 X |
| 2,588,954 | 3/1952 | Bornemann | 354/170 |
| 3,007,385 | 11/1961 | Fukuoka | 354/171 |
| 3,216,777 | 11/1965 | Allen | 352/187 X |
| 3,269,288 | 8/1966 | Sigmond | 354/171 |
| 3,280,713 | 10/1966 | Goldberg | 354/171 |
| 3,606,527 | 9/1971 | McNamee | 352/190 |

FOREIGN PATENT DOCUMENTS 509291 3/1952 Belgium .................................. 352/190

*Primary Examiner*—Richard A. Wintercorn
*Attorney, Agent, or Firm*—Wills, Green & Mueth Law Corporation

[57] ABSTRACT

A camera which includes film transport means for moving a strip of film past a lens and shutter assembly in a stepwise, frame by frame sequence, with the film being maintained stationary when the shutter is in the open position. A toothed driven gear is in operative engagement with a film driven reel. A mutilated drive gear having a toothed portion with an end gear tooth and a smooth peripheral portion is rotated in time relationship with the opening and closing of the shutter. The driven gear contains a space between adjacent gear teeth (as by removing one gear tooth) whereby the end tooth of the drive gear is received in said space to facilitate the smooth "meshing" of the drive gear with the driven gear. The drive gear carries an arcuate cam segment and the driven gear carries an annular cam with an arcuate recess in the outer face thereof, whereby the arcuate cam segment is received in said recess when the shutter is in the open position, and the driven gear and the film driven reel are thereby maintained immobile.

7 Claims, 7 Drawing Figures

FILM ADVANCE CONTROL MECHANISM

BACKGROUND AND BRIEF SUMMARY OF THE INVENTION

The present invention relates generally to surveillance cameras of the type shown and described in U.S. Pat. No. 3,606,527, the disclosure of which is incorporated herein by reference, and more particularly to a novel film advance control mechanism which prevents film vibration or oscillation, as might be caused by the starting and stopping of the movement of the film relative to the lens assembly.

As described in the aforementioned patent, a surveillance camera of the type under consideration is designed to be started by manual or semiautomatic means upon the occurrence of a robbery in a bank, department store, or the like, and to take pictures of the area at the rate of about a frame a second, for from five to ten minutes.

The intermittent film drive of the aforementioned camera includes a full toothed driven gear and a mutilated drive gear, with the latter being mounted on a drive shaft which can flex laterally in the vicinity of the inter-engaging gears if the top or crown of the lead tooth of the drive gear were to contact the top or crown of a tooth of the driven gear when the gears are reengaged so as to move the film the distance equal to one frame. Although such a relationship occurs infrequently and the tooth of the driving gear promptly slips into position between adjacent teeth on the driven gear, such an occurrence causes a slight variation in the spacing between the frame previously exposed and the frame next to be exposed, and there is some possibility of the drive motor stalling.

The aforementioned camera also includes a flexible belt drive between a pulley on the film driven reel and a pulley on the film takeup reel, with the latter pulley being somewhat larger than the pulley on the film driven reel, whereby to assure there is no buckling of the film between the two reels. However, such a construction results in a limited amount of "slippage" of the flexible belt on the pulley of the film takeup reel when the movement of the film is stopped, which, in turn, causes a slight oscillation of the film driven reel and a possible blurring of the image on the frame of the film then being exposed.

In view of the aforementioned potential problems and deficiencies in what is otherwise a very simple, relatively inexpensive and reliable surveillance camera, it is an object of the present invention to provide a novel film advance control mechanism which assures that the width of the frame or section of film being exposed, is uniform in size.

Another object of the invention is to provide such a novel film advance control mechanism which maintains the film driven reel stationary and without any oscillation whatsoever during the time the film is being exposed, whereby there is no blurring of any of the images as would be caused by movement of the film as it is being exposed.

I have discovered that the above objects and advantages are achieved by providing an arcuate cam segment which is carried by the mutilated drive gear, and an annular cam which is carried by the driven gear, with the annular cam containing an arcuate recess in the outer periphery thereof for receiving the arcuate cam segment in close face to face relationship when the shutter is in the open position, whereby the driven gear and the film driven reel are maintained immobile when the shutter is open and the film is being exposed.

I have also discovered that the meshing of the mutilated drive gear with the driven gear can be achieved without having the gear teeth meet in crown to crown disruptive engagement, by providing a space between adjacent teeth on the driven gear, of a size which is obtained by removing one gear tooth.

DESCRIPTION OF THE PREFERRED EMBODIMENT

Figure 1:
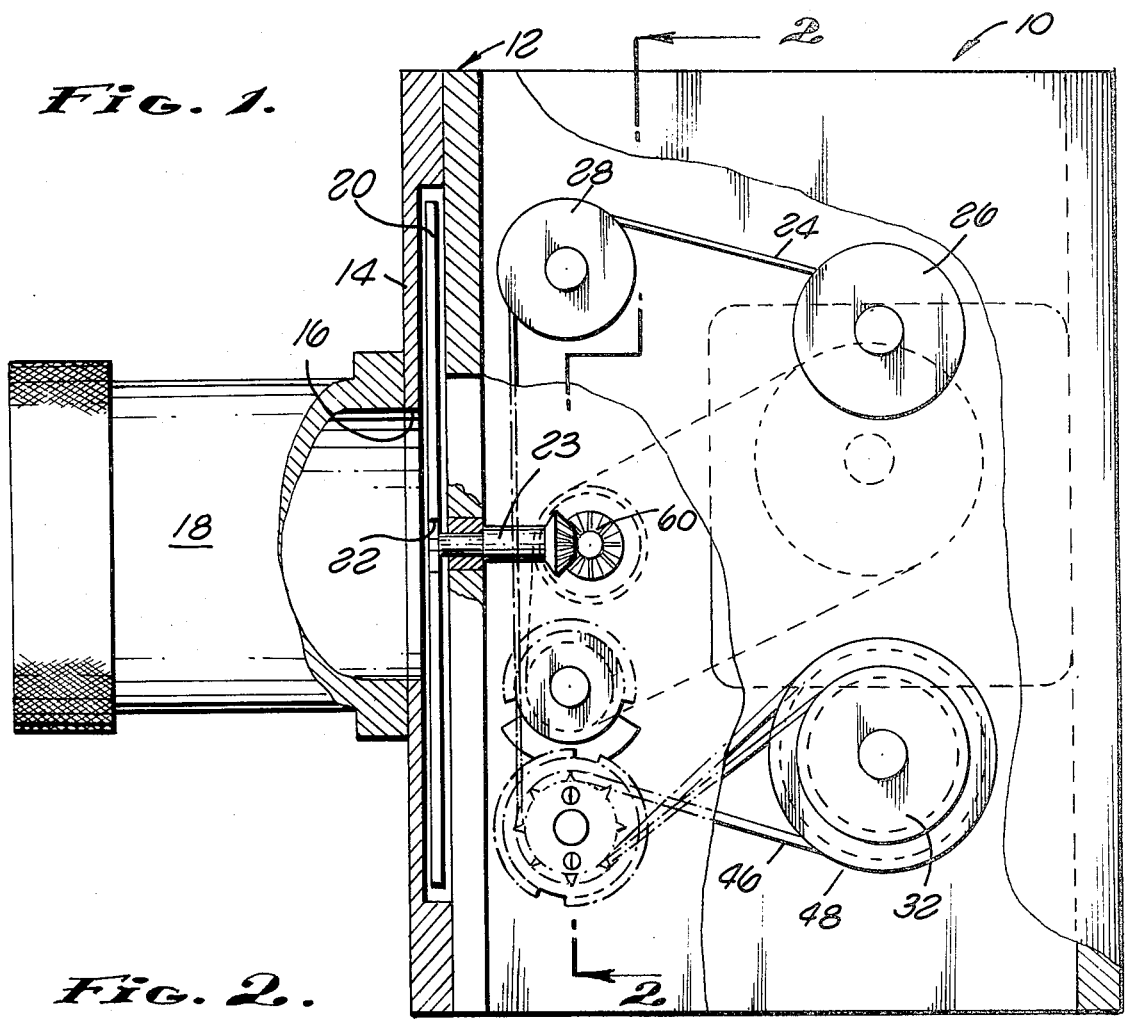
FIG. 1 is a top plan view of a camera constructed in accordance with the teachings of the present invention, with a portion of the top wall thereof being broken away to show the various film reels.

Referring to the drawings more particularly by reference numerals, and particularly to FIG. 1, the number 10 indicates generally a surveillance camera embodying the teachings of the present invention, which includes a housing 12 containing a frontal wall 14 with a lens aperture 16 therein, and a lens assembly 18 mounted on the front wall in axial alignment with the lens aperture 16.

Positioned in back of the lens aperture 16 is a rotatably mounted shutter disc 20 which contains a slit aperture 22 and which is rotated by a shutter driven shaft 23 which is fastened thereto, and which, in turn, is driven by a motor, all of which will be described more fully hereinafter.

A length of film 24 is adapted to be moved intermittently in a step-by-step or frame-by-frame manner, in back of the shutter disc 20 and across the lens aperture 16, and is supported on and carried by a film supply reel 26, an idler reel 28, a film driven reel 30, and a film takeup reel 32.

The housing 12 further includes a top wall 34, a reel support wall 36, and upper and lower bearing support walls 38 and 40, respectively.

Figure 2:
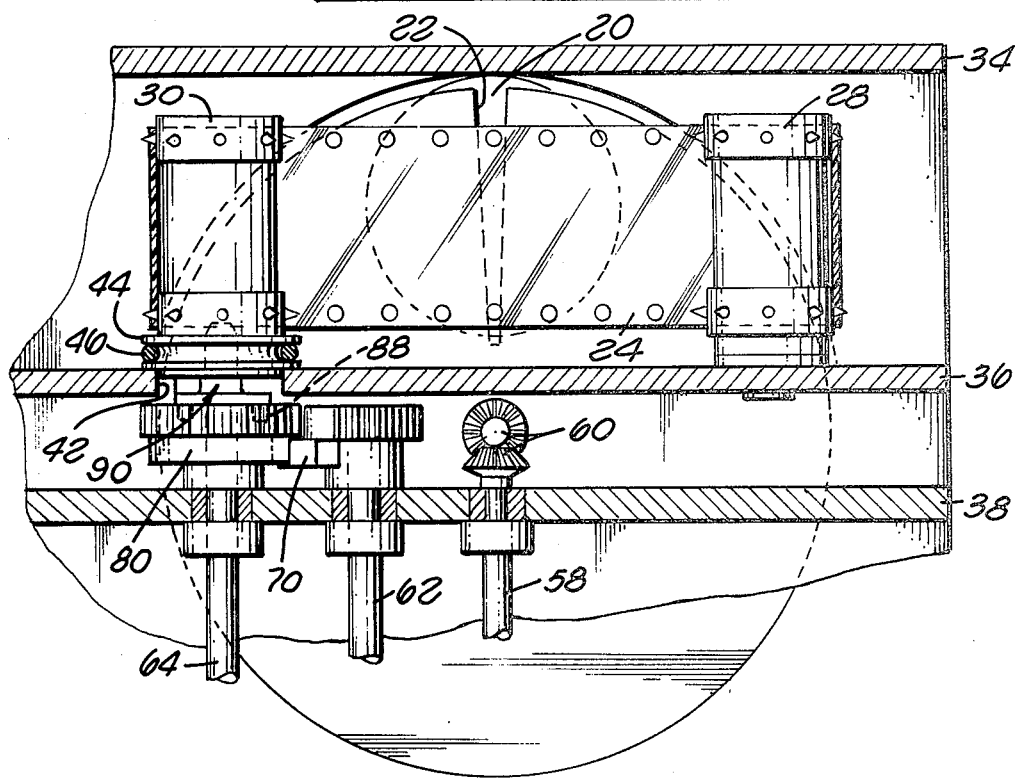
FIG. 2 is a fragmentary, vertical, sectional view taken on the line 2—2 in FIG. 1, with the slit aperture of the shutter being shown in the center of the lens aperture.

As indicated in FIG. 2, reels 26, 28 and 32 are rotatably supported on the reel support wall 36, whereas the film driven reel 30 is positioned above an aperture 42 contained in the wall 36. The film driven reel 30 contains a pulley wheel 44 at the lower end thereof, which receives an endless flexible belt 46, which is also in operative engagement with a similar pulley wheel 48 positioned adjacent the lower end of the film takeup reel 32. As mentioned move, the pulley wheel 48 is larger in diameter than the pulley wheel 44 to assure that there is no buckling of the film 24 between the film driven reel 30 and the film takeup reel 32.

Figure 3:
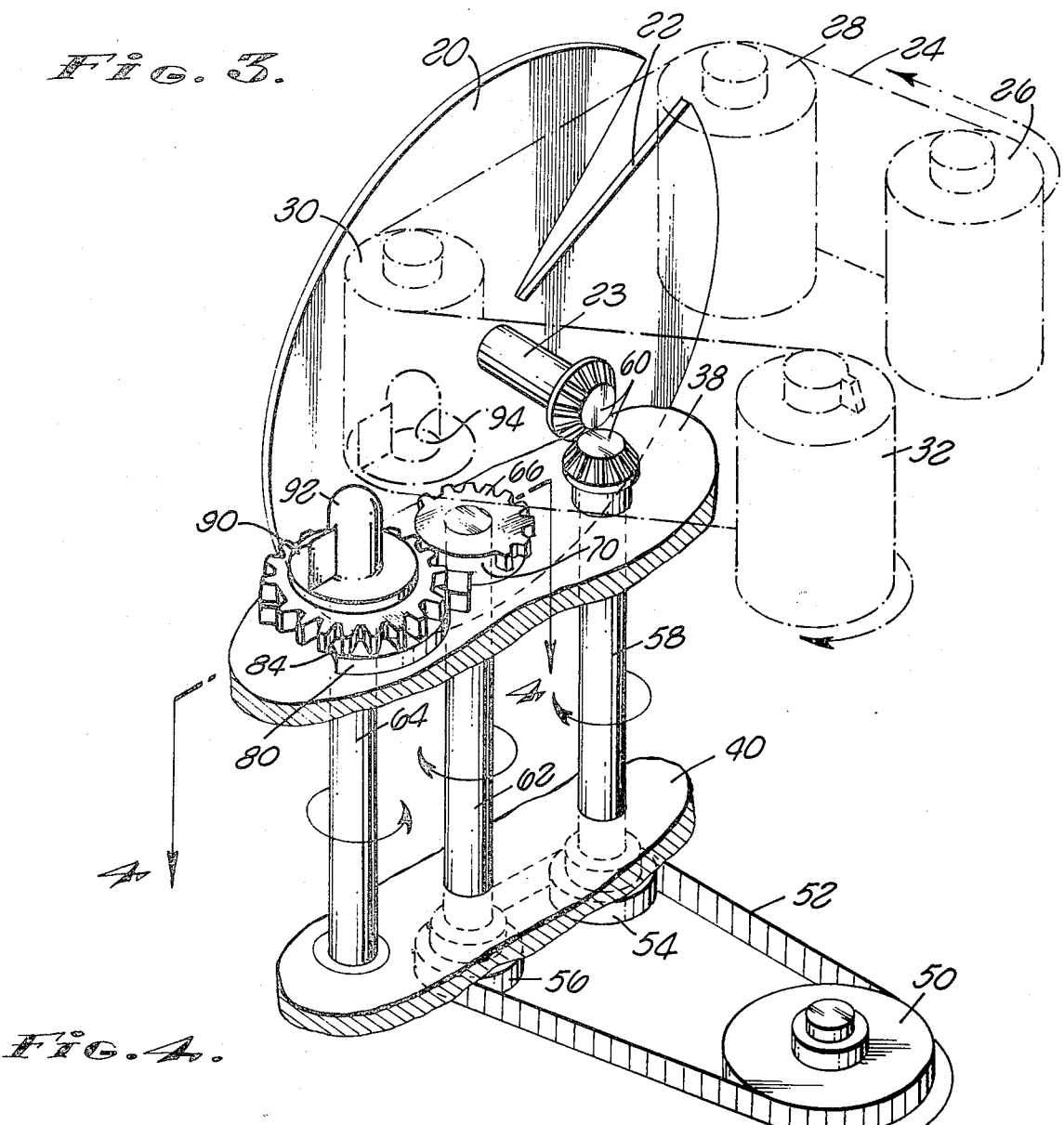
FIG. 3 is a fragmentary, perspective view of the mechanism for driving and controlling the movement of the film relative to the lens aperture.

The drive mechanism shown in FIGS. 2 and 3 includes a drive sprocket wheel 50 which is rotated by an electrical motor (not shown), and which drives a sprocket chain 52 which is in operative engagement with the first and second driven sprocket wheels 54 and 56, respectively.

The first driven sprocket wheel 54 is mounted on the lower end of a shutter drive shaft 58 which actuates the aforementioned shutter driven shaft 23 and the shutter disc 20 through a set of bevel gears 60.

The second driven sprocket wheel 56 is mounted on the lower end of a film drive shaft 62, and positioned adjacent thereto in parallel, spaced relationship is a rotatably mounted film driven shaft 64.

Mounted on the upper end of the film drive shaft 62 is a mutilated drive gear 66 which contains an arcuate array or group of gear teeth 67 including an end gear tooth 68 and a smooth or toothless portion 69. Positioned beneath the drive gear and carried thereby in coaxial relationship is an arcuate cam segment 70 which includes an outer face 72 and which is diametrically opposite from the group of gear teeth 67.

Mounted on the upper end of the film driven shaft 64 is a driven gear 74 which has, in effect, two gear teeth removed therefrom at positions 76 and 78 which are 180° apart. Positioned beneath the driven gear 74 and carried thereby in coaxial relationship is a disc or annular cam 80 which has two arcuate recesses 82 and 84 in the outer face thereof, which recesses are also 180° apart and in close relationship with the aforementioned spaces 76 and 78, for a purpose to appear.

Spaced apart recesses 86 are provided in the upper face of the driven gear 76 for receiving depending projections 88 of a "floating" adapter 90 which includes an upwardly extending shaft-like projection 92 which is received in a complimentary recess 94 providing in the lower portion of the film driven reel 30, in driving relationship therewith.

In operation, the drive sprocket wheel 50 is rotated by a motor (not shown) responsive to the closing of a switch either manually or by semiautomatic means. This results in the first and second driven sprocket wheels 54 and 56 being rotated by the sprocket chain 52.

The rotation of the first driven sprocket wheel 54 causes the shutter disc 20 to be rotated at a constant rate of speed through the shutter drive shaft 58, the beveled gears 60 and the shutter driven shaft 23.

The rotation of the second driven sprocket wheel 56 causes rotation of the film drive shaft 62 at the same rate of speed as the shutter drive shaft 58. The rotation of the film drive shaft 62 causes rotation of the mutilated drive gear 66 and the arcuate cam segment 70 carried thereby.

Figure 4:
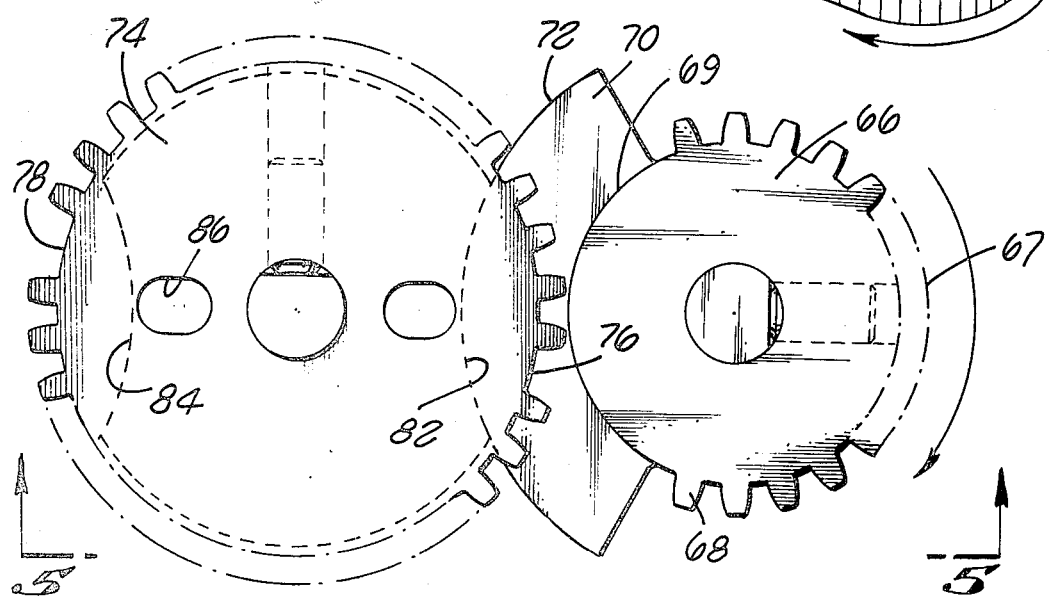
FIG. 4 is an enlarged, tip plan view of the film advance driven gear assembly and the film advance drive gear assembly, taken generally on the line 4—4 in FIG. 3.

Referring to FIGS. 3 and 4, when the film drive gear 66 and the film driven gear 74 are in the positions shown in the drawings, with the toothless portion of the drive gear 66 being in opposed relationship with the teeth on the driven gear 74, there is no movement of the driven gear and according there is no movement of the film driven reel 30.

As the drive gear 66 rotates in the clockwise direction as shown in FIG. 4, the end tooth 68 and the one adjacent thereto are received in the space 76 on the driven gear 74, whereby there is a smooth meshing of these gears and without the crowns of the gear teeth coming into engagement. When the driven gear 74 starts to rotate, this results in the rotation of the film driven reel 30 and the movement of the film strip 24.

The rotation of the film drive shaft 62 and the mutilated drive gear 66 are in timed relationship with the rotation of the shutter drive shaft 58, whereby the slit aperture 22 of the shutter disc 20 is moved across the lens aperture 16 during the period of time when the toothless portion 69 of the drive gear 66 is in opposed relationship with the teeth of the driven gear 74, as illustrated in FIG. 4. Conversely, when the teeth of the drive gear 66 are in operative engagement with the teeth of the driven gear 74 so as to cause the rotation of the driven gear 74 and the movement of the film strip 24, the slit aperture 22 of the shutter disc 20 is being rotated away from the lens aperture 16.

Figure 5:
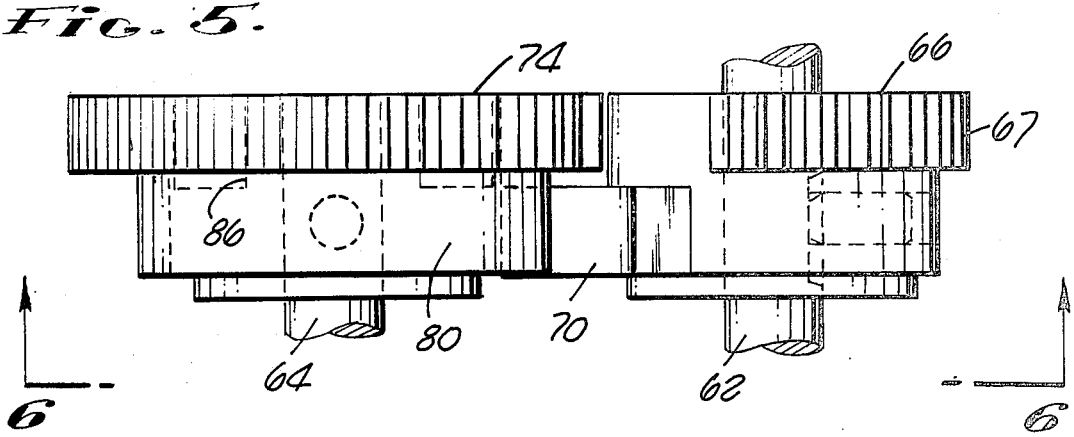
FIG. 5 is an elevational view of the aforesaid gear assemblies, taken generally on the line 5—5 in FIG. 4.
Figure 6:
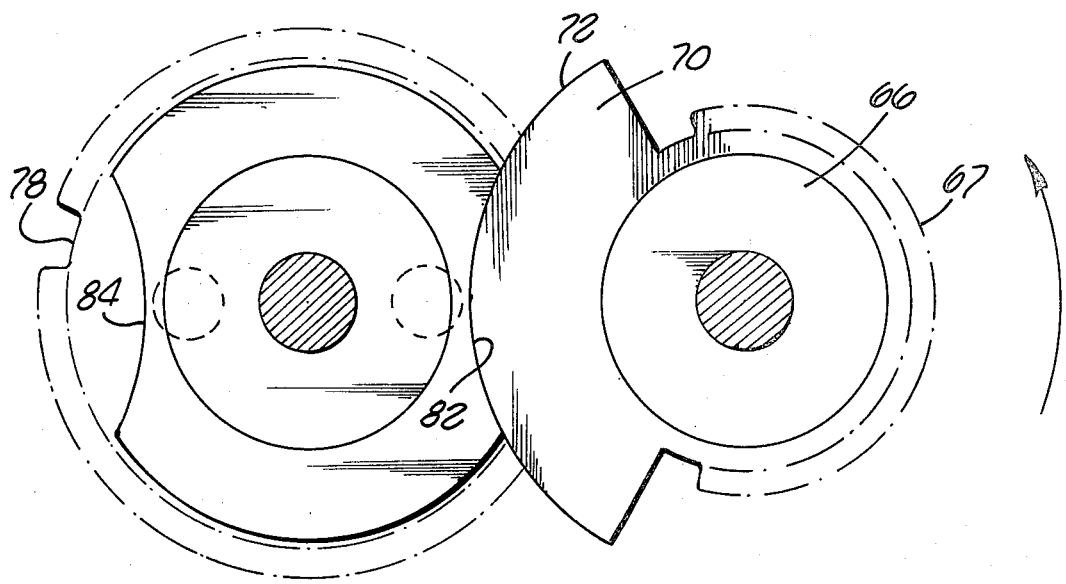
FIG. 6 is a bottom view of the aforesaid gear assemblies taken generally on the line 6—6 in FIG. 5, showing the film advance driven gear in the stationary or immobile position.

When the driven gear 74 and the film driven reel 30 are not being rotated and the film strip 24 is stationary it is important that the driven gear 74 remain immobile. This result is achieved by the outer face 72 of the arcuate cam 70 being in close face-to-face relationship with the face of the arcuate recess 82 of the annular cam 80. This is illustrated in FIGS. 4, 5 and 6.

Figure 7:
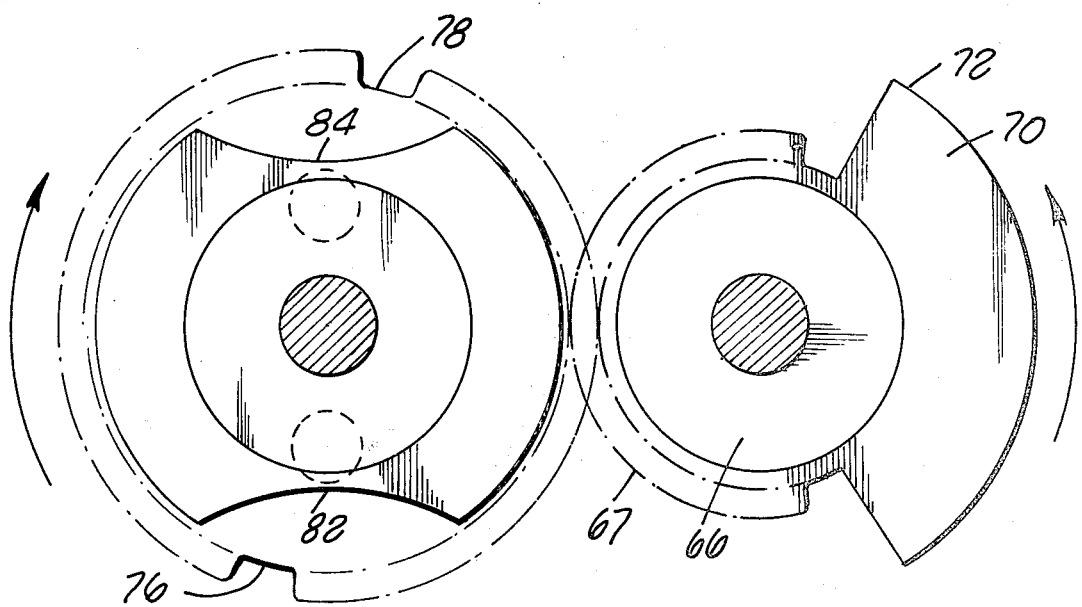
FIG. 7 is a view similar to FIG. 6, except that the film advance driven gear is being rotated by the movement of the mutilated film advance drive gear.

However, at the time when the end tooth 68 of the drive gear 66 engages the tooth of the driven gear 74 adjacent the space 76 so as to cause rotation of the driven gear 74, the end of the arcuate cam segment 70 has moved out of face-to-face relationship with the recess 82, whereby the driven gear 74 is free to rotate and cause the rotation of the film driven reel 30. This relationship is illustrated in FIG. 7, in which the driven gear 74 is being freely rotated by the drive gear 66.

I have found it advantageous to provide the driven gear 74 with approximately twice as many gear teeth as are on the drive gear 66, whereby the latter rotates two times for each rotation of the driven gear 74. Accordingly, the driven gear 74 is provided with diametrically opposed arcuate recesses 82 and 84. In the preferred construction, the drive gear is designed to have 36 teeth, with 14 teeth being removed to result in 22 remaining teeth. The driven gear 74 is designed to have 48 teeth, with two being removed to provide the spaces 76 and 78.

Thus, it is apparent that there has been provided a novel film advance control mechanism which fullfulls all of the object and advantages sought therefor.

What is claimed is:

1. In a camera which includes a lens aperture, a shutter mechanism which has an open position and a closed position relative to the lens aperture, film transport means for moving a strip of film in frame by frame sequence past said lens aperture and including a film supply reel and a film driven reel, and means for continuously actuating said shutter mechanism between the closed position and the open position; a film advance control mechanism which comprises:

means coupled with said shutter actuating means for controling the movement of the film transport means whereby the film remains stationary at one frame position during the time the shutter is in the open position and moves to the next frame position during the time the shutter is in the closed position, including a toothed driven gear connected to the film transport means and containing an enlarged space between adjacent gear teeth at at least one position on the periphery thereof of a size equivalent to the removal of one gear tooth;

a mutilated drive gear having a smooth peripheral portion and a tooth portion with an end gear tooth adjacent to said smooth portion;

said drive gear and said driven gear being positioned in close operative relationship whereby upon rotation of the drive gear, said end tooth and the one adjacent thereto can be received in the enlarged space on the driven gear;

means for rotating the mutilated drive gear in timed relationship with the shutter actuating mechanism whereby the teeth of the mutilated drive gear are in operative position in engagement with the teeth of the driven gear when the shutter is in the closed position, and the smooth peripheral portion of the drive gear is in said operative position when the shutter is in the open position; and means for maintaining said driven gear immobile when the shutter is in the open position.

2. In a camera which includes a lens aperture, a shutter mechanism which has an open position and a closed position relative to the lens aperture, film transport means for moving a strip of film in frame by frame sequence past said lens aperture and including a film supply reel and a film driven reel, and means for continuously actuating said shutter mechanism between the closed position and the open position; a film advance control mechanism which comprises:

means coupled with said shutter actuating means for controlling the movement of the film transport means whereby the film remains stationary at one frame position during the time the shutter is in the open position and moves to the next frame position during the time the shutter is in the closed position, including a toothed driven gear connected to the film transport means;

a mutilated drive gear having a smooth peripheral portion and a toothed portion;

said drive gear and said driven gear being positioned in close operative relationship;

means for rotating the mutilated drive gear in timed relationship with the shutter actuating mechanism whereby the teeth of the mutilated drive gear are in operative position in engagement with the teeth of the driven gear when the shutter is in the closed position, and the smooth peripheral portion of the drive gear is in said operative position when the shutter is in the open position;

an arcuate cam segment having an outer face carried by the mutilated drive gear in coaxial relationship therewith;

an annular cam carried by the driven gear in coaxial relationship, said annular cam containing at least one arcuate recess in the periphery thereof and having an outer face; and said arcuate recess being constructed and arranged to receive said arcuate cam segment in close face to face relationship when the shutter is in the open position, whereby the driven gear and the film remain stationary when the shutter is in the open position.

3. The film advance control mechanism described in claim 1, in which the means for maintaining said driven gear immobile when the shutter is in the open position includes:

an arcuate cam segment having an outer face carried by the mutilated drive gear in coaxial relationship therewith;

an annular cam carried by the driven gear in coaxial relationship, said annular cam containing at least one arcuate recess in the periphery thereof having an outer face; and said arcuate recess being constructed and arranged to receive said arcuate segment in close face to face relationship when the shutter is in the open position.

4. The film advance control mechanism described in claim 1, in which:

the driven gear contains two such enlarged spaces in diametrically opposed relationship and the gear contains forty-six teeth; and the mutilated drive gear contains twenty-two teeth.

5. The film advance control mechanism described in claim 2, in which:

the annular cam contains two such arcuate recesses in the periphery thereof; and the drive gear and the driven gear are constructed and arranged so that the drive gear rotates twice for each single revolution of the driven gear.

6. The film advance control mechanism described in claim 1, in which:

the driven gear is a forty-eight tooth gear with two teeth removed therefrom at diametrically opposed positions; and the mutilated drive gear is a thirty-six tooth gear with fourteen adjacent teeth removed therefrom.

7. The film advance control mechanism described in claim 2, in which:

the arcuate cam segment carried by the mutilated drive gear is in diametrically opposed relationship with the tooth portion of said gear.

* * * * *